United States Patent
Doerr

[19]

[11] Patent Number: 6,088,144
[45] Date of Patent: Jul. 11, 2000

[54] DETECTION OF FREQUENCY-MODULATED TONES IN ELECTROMAGNETIC SIGNALS

[75] Inventor: Christopher Richard Doerr, Atlantic Highlands, N.J.

[73] Assignee: Lucent Technologies Inc., Murray Hill, N.J.

[21] Appl. No.: 08/713,491

[22] Filed: Sep. 13, 1996

[51] Int. Cl.[7] .................................................. H04B 10/06
[52] U.S. Cl. ............................................................ 359/193
[58] Field of Search ...................................... 359/110, 154, 359/155, 173, 180, 182, 189, 195, 193; 375/224

[56] References Cited

U.S. PATENT DOCUMENTS

| | | | |
|---|---|---|---|
| 3,984,190 | 10/1976 | Barrett et al. | 356/75 |
| 3,999,854 | 12/1976 | Barrett et al. | 356/75 |
| 4,647,203 | 3/1987 | Jones et al. | 356/345 |
| 4,995,697 | 2/1991 | Adamovsky | 356/345 |
| 5,025,487 | 6/1991 | Eichen | 359/182 |
| 5,134,509 | 7/1992 | Olshansky et al. | 359/132 |
| 5,151,908 | 9/1992 | Huber | 372/6 |
| 5,513,194 | 4/1996 | Tamura et al. | |
| 5,678,198 | 10/1997 | Lemson | 455/67.1 |
| 5,696,614 | 12/1997 | Ishikawa et al. | 359/124 |
| 5,768,312 | 6/1998 | Imamura | 359/110 |
| 5,815,296 | 9/1998 | Kubota | 359/133 |
| 5,850,301 | 12/1998 | Mizuochi et al. | 359/124 |

*Primary Examiner*—Leslie Pascal
*Attorney, Agent, or Firm*—Steve Mendelsohn

[57] ABSTRACT

An apparatus and method for detecting a channel of a fiber-optic system. According to one embodiment, a filter is adapted to receive an electromagnetic signal resulting from modulation of a carrier frequency over a frequency range by a modulation signal. The filter has a plurality of transmissivity peaks over the frequency range, whereby the filter generates a plurality of intensity pulses as frequency of the electromagnetic signal varies over the frequency range. A detector is adapted to detect the modulation signal based on the plurality of intensity pulses. According to another embodiment, an electromagnetic signal corresponding to a channel and resulting from modulation of a carrier frequency over a frequency range by a modulation signal is received. A plurality of intensity pulses are generated as frequency of the electromagnetic signal varies over the frequency range, and the channel is detected in accordance with the intensity pulses.

36 Claims, 2 Drawing Sheets

DETECTION OF FREQUENCY-MODULATED TONES IN ELECTROMAGNETIC SIGNALS

BACKGROUND OF THE INVENTION

1. Field of the Invention

The present invention relates to fiber-optic communications, and, in particular, to detecting the existence of data channels carried by fiber-optic systems.

2. Description of the Related Art

Data may be transmitted through a particular communications medium, such as a fiber-optic cable, by way of multiple data channels, where each channel carries a data signal at a particular carrier frequency. Because each frequency is associated with a different wavelength, such systems are multi-wavelength systems, which are sometimes referred to as wavelength division multiplexed (WDM) systems or networks.

WDM systems may use a fiber-optic cable as the communications medium. The fiber-optic cable carries light signals from a transmitter to one or more receivers. These light signals are sent on one or more of the multiple channels, each channel being defined by a different light wavelength. The signal transmitted by light of a particular wavelength on a particular channel may be a digital signal, in which case light is transmitted to indicate a binary "1," and not transmitted to indicate a binary "0." Thus, channel 1 may carry light of a first frequency (or wavelength), channel 2 light of a second frequency, and so forth, each frequency of light turning on and off independently to represent 1s and 0s. Such carrier frequencies are typically in the hundreds of TeraHertz, such as 193.48622 THz. The presence of light at the first frequency indicates a "1" on channel 1, while its absence indicates a "0". At such frequencies, such channels may carry binary data on the order of 2.5 Gigabits/sec.

In such systems, signals may be transmitted over relatively long distances, for example from New York City to Washington, D.C. Optical amplifiers (OAs) are used along the route to buffer the signals, which otherwise would degrade. These OAs may be placed, for example, every 20 km or so. One type of OA is an Erbium-doped fiber amplifier (EDFA). An EDFA comprises a portion of a fiber-optic cable doped with Erbium ions and a laser diode. The light from the laser diode excites the Erbium. The light signals of the channels carried by the fiber-optic cable enter the EDFA portion of the cable and stimulate photon emission by the excited Erbium ions, which effectively boosts (i.e. amplifies) the light signals. Current EDFAs can amplify input light that has a wavelength between 1550–1560 nanometers. This 10 nanometer bandwidth provides over a TeraHertz of frequency range, which is sufficient to support an eight-channel WDM system.

At a point somewhere along the communications medium, such as at a tap node, receiver, or other station of the system, it is often desirable to determine whether signals are being transmitted on predefined channels of the system, and what the power level of the signal being transmitted on each channel is. If, for example, a channel 1 signal is supposed to be present, a failure to detect a signal on channel 1 at a given point in the system can be used for diagnostic purposes. For example, a failure to detect a signal on one or more channels may indicate that one of the EDFAs is malfunctioning, if that channel is supposed to be present. Similarly, detection of a lower than normal power level can indicate some problem in the system that is affecting the transmission of data on channel 1. When a signal is being transmitted on a particular channel and is present at a further point in the system, the channel may be said to exist at that point in the system. The channel may also be said to have a given power level at that point in the system, corresponding to the average power level of the signal carried by that channel.

One way to detect the existence of a channel is to utilize a standard photodetector and receiver approach that would normally be used for receiving and decoding the information carried by the channel itself. However, this approach is often undesirable because it can require relatively complex or expensive components that may not otherwise be required at that node of the system. While certain nodes may require such equipment in order to actually decode the transmitted data, it can be inefficient to require the use of such sophisticated, potentially expensive, and complex devices whenever it is desired to merely detect the existence or measure the power of a channel.

Another way to detect the existence of a channel at a particular point in the system is to utilize amplitude-modulated (AM) tones of a lower frequency than the carrier frequency of the channel. In such an approach, a different low-frequency AM tone is placed on each channel at the transmitter side. These tones may then be measured at a particular station or node of the system, with devices suitable for detecting signals at these much lower frequencies. A typical AM tone for a given channel may be a 1 KHz tone, which causes the average power level of the channel to vary at 1 KHz. Because the AM tone is added to the light signal of a given channel, the AM tone's presence and power is indicative of the channel's existence and power level. One drawback of such an approach, however, is that the AM components of the tones can mix together significantly in the EDFAs of the fiber-optic cable. Further, such AM tones can also interfere with the data in the channels. One reason for such problems is that lower-frequency signals, such as the AM tones, can deplete the gain of typical EDFAs, causing cross-talk between channels because of the time lag in changes of the EDFA's gain.

There is a need, therefore, for methods and apparatuses for detecting the presence, and measuring the power, of modulation of channels.

Further objects and advantages of this invention will become apparent from the detailed description which follows.

SUMMARY OF THE INVENTION

The present invention is an apparatus and a method for detecting a channel of a fiber-optic system. According to one embodiment of the invention, the invention comprises a filter and a detector. The filter is adapted to receive an electromagnetic signal resulting from modulation of a carrier frequency over a frequency range by a modulation signal. The filter has a plurality of transmissivity peaks over the frequency range, whereby the filter generates a plurality of intensity pulses as frequency of the electromagnetic signal varies over the frequency range. The detector is adapted to detect the modulation signal based on the plurality of intensity pulses. According to another embodiment of the invention, an electromagnetic signal corresponding to a channel and resulting from modulation of a carrier frequency over a frequency range by a modulation signal is received. A plurality of intensity pulses are generated as frequency of the electromagnetic signal varies over the frequency range, and the channel is detected in accordance with the intensity pulses.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

In the present invention, frequency-modulated tones are used to modulate channels carrying electromagnetic signals. In one embodiment, a different low-frequency FM tone is placed on each channel, for example by modulating the gain section of the laser transmitting the channel signals, so that its carrier frequency varies at the FM tone frequency.

Figure 1:
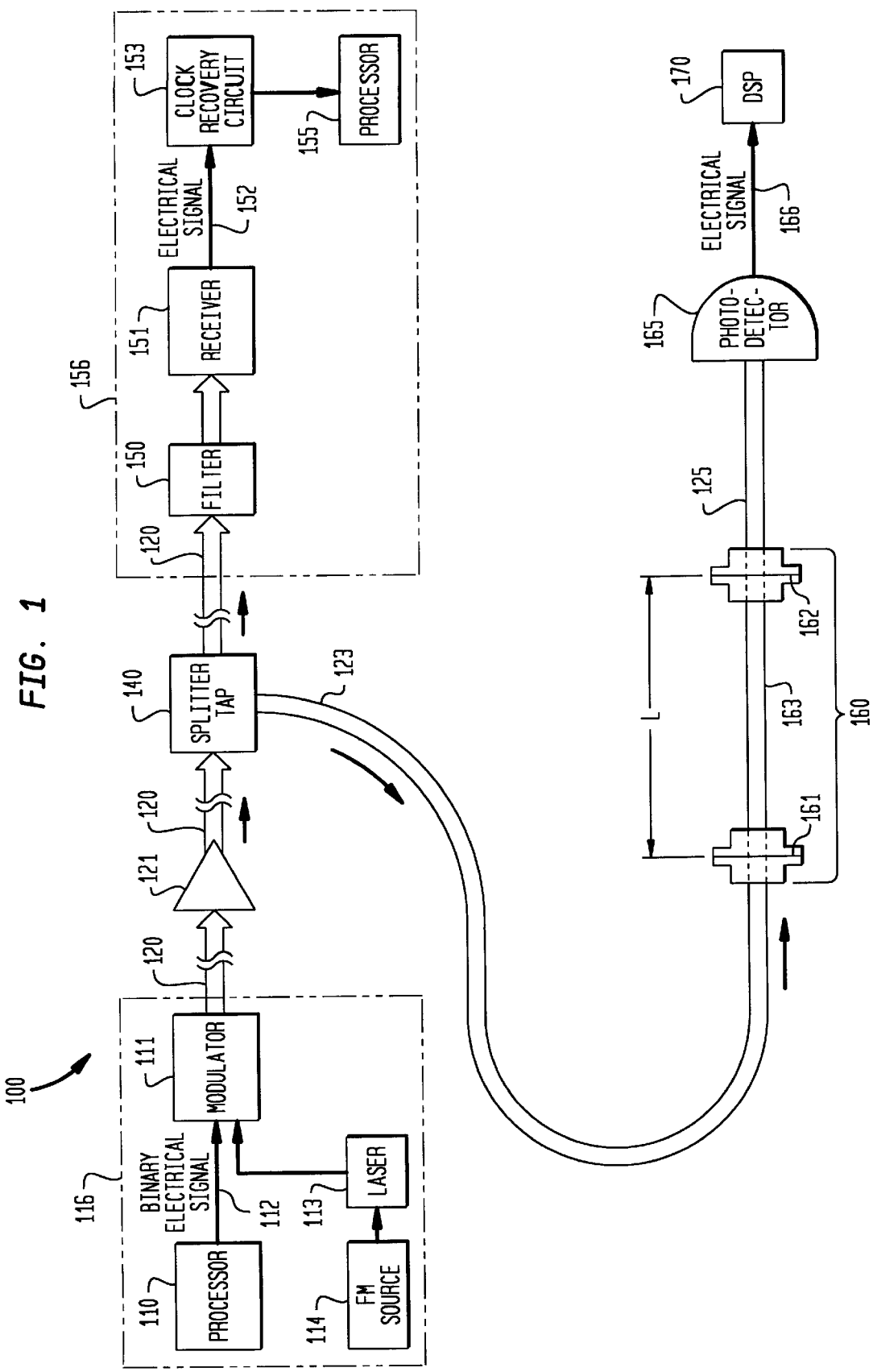
FIG. 1 is a fiber-optic multi-wavelength data transmission system in accordance with one embodiment of the present invention.

Referring now to FIG. 1, there is shown a fiber-optic multi-wavelength data transmission system 100 in accordance with one embodiment of the present invention. System 100 comprises transmitting end 116 connected to receiving end 156 via fiber-optic cable 120. Transmitting end 116 comprises processor 110, modulator 111, laser 113, and FM source 114. Various EDFAs, such as EDFA 121, are inserted periodically within cable 120, typically both before and after signal splitter 140. Receiving end 156 comprises filter 150, receiver 151, clock recovery circuit 153, and processor 155. System 100 also comprises signal splitter 140, Fabry-Perot interferometer 160, photodetector 165, and digital signal processor (DSP) 170. As illustrated in FIG. 1, system 100 is configured to detect the existence and power level of one or more channels at the portion of cable 120 at splitter 140. Interferometer 160 comprises reflectors 161 and 162 separated by a distance L, and fiber-optic cable 163. Interferometer 160 is coupled to photodetector 165 by fiber optic cable 125.

The following description will focus on frequency modulation of and detection of such modulation in a single data channel, referred to herein as channel 1. Processor 110 generates an electrical binary input signal which is fed, by line 112, to modulator 111. Light at the channel 1 carrier frequency is generated by laser 113. For example, the laser light generated by laser 113 may be channel 1 light at a defined frequency of 193.48622 THz. This laser light is modulated by modulator 111 to provide a channel 1 light signal transmitted via cable 120. Modulator 111 switches laser light from laser 113 on and off in accordance with the binary input signal received from processor 110, by allowing the transmission of the laser light or by blocking the transmission of laser light, respectively. As will be understood, the digital data transmission rate is determined by the frequency at which modulator 111 turns on and off laser light from laser 113, in response to the input signal on line 112. Thus, modulator 111 may be a chopper. For a channel with a carrier frequency of 193.48622 THz, for example, the digital data transmission rate may be around 2.5 Gigabits/sec.

Splitter 140 taps off a portion of the channel 1 light signal into fiber-optic cable 123. The rest of the channel 1 light signal continues past splitter 140 into the continuing length of cable 120. The channel 1 light signal is received by filter 150, which is an optical filter designed to filter out frequencies outside of the bandwidth of channel 1. Receiver 151, which comprises a suitable photodetector, converts the channel 1 light signal to electrical signals on line 152. These electrical signals are converted to binary signals by clock recovery circuit 153, which samples the signal on line 152 at the digital data transmission rate, or at some multiple thereof when oversampling is used. The binary data produced by clock recovery circuit 153 is then received by processor 155.

System 100 also comprises FM source 114, which provides a low-frequency tone as a modulation signal to laser 113, for example a 1 KHz tone. Laser 113 is configured to modulate the frequency of generated laser light around the carrier frequency in accordance with the modulation signal from FM source 114. Thus, FM source 114 may be considered to be a modulation-signal source and laser 113 may be considered to be a modulated-signal generator that generates a modulated signal in accordance with the modulation signal. In one embodiment, the FM tone is a 1 KHz tone, which causes the frequency of the laser light produced to vary ±2 GHz. Thus, at a frequency of 1 KHz, the frequency of laser light generated varies from 193.48422 to 193.48822 THz, about a carrier frequency of 193.48622 THz. Since the laser light frequency for channel 1 varies ±2 GHz about the carrier frequency, the channel may be said to have a 4-GHz frequency excursion or frequency range. As will be appreciated, the laser light generated by laser 113 may be considered to be an electromagnetic signal resulting from modulation of a carrier frequency (e.g. 193.48622 THz) over a frequency range (e.g. ±2 GHz) by a modulation signal (e.g. the 1 KHz tone).

In one embodiment of the present invention, the FM tone frequency (e.g. 1 KHz) is significantly lower than both the channel carrier frequency (e.g. 193.48622 THz) and the channel frequency range (e.g. 4 GHz). It is this FM tone that can be detected and measured by interferometer 160, photodetector 165, and DSP 170. Typically, the carrier frequency is highest, on the order of THz, the frequency range and the digital data transmission rate are both on the order of the low GHz, and the FM tone frequency is typically on the order of KHz or 10s of KHz. However, it will be understood that other suitable frequency ranges for these parameters may be utilized, in accordance with the principles of the present invention as described herein.

Figure 2:
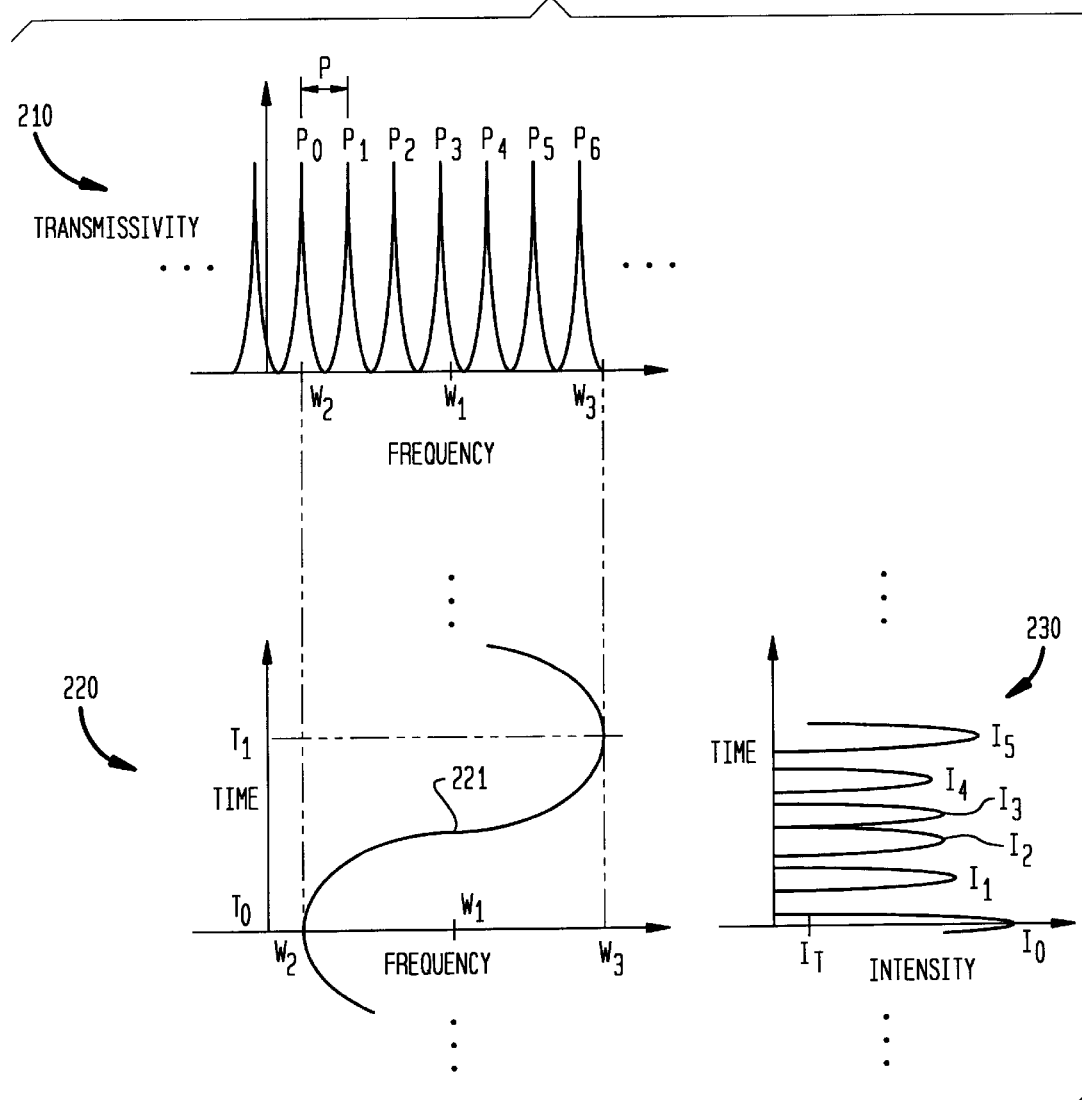
FIG. 2 are transmissivity, frequency range, and intensity graphs illustrating the method of operation of the system of FIG. 1.

Referring now to FIG. 2, there are shown transmissivity, frequency range, and intensity graphs 210, 220, and 230 illustrating the method of operation of system 100. Graph 210 plots the transmissivity of interferometer 160 versus frequency of the light signal passing therethrough, which, in this example, is the frequency of the light signal of channel 1. Graph 220 plots time versus the frequency of the light signal of channel 1, showing the changes in the signal frequency as a result of the FM tone by which it is modulated. Graph 230 plots time versus the intensity of the electrical signal generated by photodetector 165. Since the electrical signal generated by photodetector 165 is directly proportional to the intensity of the optical signal received by photodetector 165, graph 230 also plots time versus the intensity of the optical signal from interferometer 160 and received by photodetector 165.

As will be appreciated, Fabry-Perot interferometer 160 is, in the illustrated embodiment, a long-cavity fiber Fabry-Perot interferometer, comprising reflectors 161 and 162. Interferometer 160 resonates where the round-trip distance between reflectors 161 and 162, i.e. 2 L, is equal to an integer multiple of the light wavelength. For a round-trip length 2 L, interferometer 160 resonates, and thus has a high transmissivity, for light of wavelengths 2 L×n/1, 2 L×n/2, . . . 2 L×n/N, where n is the index of refraction of the interferometer medium. Typical values for n are as follows: for fiber-optic cable 163, n=1.45; for a vacuum, n=1; for air, n≈1. In one embodiment, L is on the order of ½ meter. The transmissivity of interferometer 160 as a function of the frequency of the light signal is illustrated in graph 210 of FIG. 2.

As laser 113 modulates the frequency of laser light at the FM tone frequency, the frequency of the light signal passing through interferometer 160 varies over the frequency range as illustrated in graph 220.

Thus, wave 221 is a sinusoidal wave of frequency 1 KHz. This wave represents changes in the frequency $\omega$ of the light signal itself, between frequencies $\omega_2$ and $\omega_3$, and centered about carrier frequency $\omega_1$. Thus, as will be appreciated, in the embodiment illustrated, $\omega_1$=193.48622 THz, $\omega_2$=193.48422 THz, and $\omega_3$=193.48822 THz, for a frequency range of 4 GHz (which equals ±2 GHz). As the light signal frequency varies with time (at a tone frequency of 1 KHz), the transmissivity of interferometer 160 changes periodically from high to low, as transmissivity peaks and troughs are crossed, as can be seen from graphs 210 and 220.

As illustrated in graph 210, approximately seven transmissivity peaks $P_0$–$P_6$ lie within the frequency range of channel 1, in one exemplary embodiment of the present invention. The frequency difference p (measured in Hertz) between any two adjacent peaks $P_i$ and $P_{i+1}$ is equal to c/(2 nL), where c is the speed of light, n is the index of refraction of the interferometer medium, and L is the length of interferometer 160 measured in meters. The frequency difference p between transmissivity peaks may be referred to as the free-spectral range (FSR) of the interferometer. As will be appreciated, the FSR is a measure of the periodicity in the frequency domain of the transmissivity peaks $P_i$.

Thus, as the light signal frequency $\omega$ varies, transmissivity peaks will be crossed, at which points light signals pass through reflector 162 to photodetector 165, where they are converted to electrical signals on line 166. As will be appreciated, for a half cycle of the 1 KHz tone, i.e. from time $T_0$ to time $T_1$ on graph 220, approximately seven peaks $P_i$ will be encountered, which correspond to intensity pulses $I_i$ of graph 230. Photodetector 165 serves to convert light received from interferometer 160 to electrical signals on line 166. Photodetector 165 need not be a high-performance photodetector that can respond to frequencies on the order of the channel carrier frequency (e.g., GHz or THz), but need only be sufficient to respond to the frequency on the order of the frequency of the intensity pulses $I_i$, e.g. on the order of KHz.

Thus, when an FM tone is present on a given light signal, a series of intensity pulses $I_i$ will be produced at the output of photodetector 165. Because the FM tone is sinusoidal, the spacing between pulses $I_i$ may not be perfectly regular, but will still be sufficient to allow DSP 170 to detect the existence of the FM tone and, thus, of channel 1. As long as the intensity is above a certain threshold $I_T$, each such pulse may be recognized and the FM tone and channel recognized therefrom. For example, the length L may be such that approximately 14 transmissivity peaks exist within the frequency range of channel 1. In this case, if channel 1 exists, a 1 KHz modulation should produce intensity pulses on line 166 at a frequency of approximately 14 KHz. If DSP 170 detects the existence of a signal of this frequency, it may be inferred that channel 1 exists. DSP 170 may utilize various signal processing techniques to detect and measure the power of FM tones by analyzing the intensity pulses, as will be appreciated by those skilled in the art, and as described further below, such as by use of spectral analysis of signal harmonics produced from a fast Fourier transform (FFT).

It will be appreciated that the length L of interferometer 160 is not a critical length, but only needs to be of such a length, for a given channel frequency, to provide enough transmissivity peaks within the frequency range of the channel so as to allow a photodetector to produce intensity pulses that allow the FM tone to be detected. This requirement is equivalent to requiring interferometer 160 to have an FSR smaller than the frequency range of the channel, in this case, channel 1. To lower the FSR to a sufficiently low frequency, a suitable length L is selected, e.g. ½ meter as described above, and a low-birefringence fiber with high reflectance reflectors 161, 162 is used for cable 163. For example, reflectors 161, 162 may have mirror reflectivities of approximately 95%. Preferably, interferometer 160 is insensitive to the polarization of the light signal received. Thus, fiber 163 in one embodiment has low birefringence in order to prevent polarization rotation inside the interferometer. To minimize birefringence, any bend in fiber 163 should have a relatively large radius.

Because of the relatively small FSR, no matter what the precise length L of interferometer 160 is or what the carrier wavelength of the channel is, modulation-caused changes in the channel signal frequency $\omega$ will always cross one or more transmissivity peaks per FM tone cycle. As explained above, this generates a series of intensity pulses that is periodic with the FM tone frequency. Thus, for a 1 KHz FM tone, intensity pulses may be produced at, for example, 14 KHz, 5 KHz, or even 1 or 2 KHz, depending upon how many transmissivity peaks are crossed per FM tone cycle.

The intensity of each pulse $I_i$ may also be measured by DSP 170 to determine the average power of the channel. To do this, as will be appreciated, DSP 170 detects a signal at 1 KHz, isolates this signal, and determines its average magnitude or power. With the intensity pulses having relatively low frequencies on the order of 10s of KHz, such a measurement may be performed by digitally sampling the electrical signal produced by photodetector 165, taking the FFT, and analyzing the spectrum harmonics with a suitable signal processing technique. As will be appreciated, performing an FFT on the electrical intensity pulses provides a series of spectral lines, or harmonics, characteristic of the frequencies and amplitudes of the intensity pulses. The harmonics caused by an FM tone may have a high signal-to-noise ratio, because of the high extinction ratio of the electrical intensity pulses generated by photodetector 165. Although the power in a given harmonic may drift with time, a reliable measure of power in the channel may be obtained by adding together the power in many or all of the harmonics.

As will be appreciated, in one embodiment, multiple channels of light signals are present in line 123, each having a characteristic light signal carrier frequency as well as a unique FM tone frequency at which the channel light signal is modulated. In this case, interferometer 160 is of such a length L so that an adequate number of transmissivity peaks exists for each channel within the channel frequency range, to allow intensity peaks to be generated so that the FM tone may be detected. In this case, the output of photodetector 165 will be a superimposed set of the FM tones, each having a unique frequency and corresponding unique set of intensity pulses that can be isolated and detected by DSP 170. DSP 170 can also measure the average power of each FM tone detected.

Advantages

One advantage of the present invention is that adjustment of the exact locations of and frequency difference between transmissivity peaks, and stabilization thereof, are not required. This is so because, even if the length L is changed or if the carrier frequency $\omega_1$ of the laser drifts somewhat, there will still be several transmissivity peaks between the limits of the channel frequency range, so that the FM tone will still cause several such transmissivity peaks to be crossed per FM tone cycle. Therefore, the frequency range of each channel does not need to be set precisely in order to measure the power or detect the existence of a channel with the present invention, so long as enough transmissivity peaks are crossed per cycle of the FM tone.

As explained above, there are various drawbacks in using AM modulation. Therefore, the present invention is advantageous because it allows FM modulation to be utilized to detect channels. A further advantage of the present invention is that FM modulation may also be advantageously applied to the use of solitons. As will be appreciated, a soliton system is one in which a pulse of light, called a soliton pulse, is sent for each binary 1 to be transmitted, rather than the light remaining on unless a 0 is to be transmitted. As will be appreciated, transmitting data in solitons helps to keep the laser light from dispersing in the optical fiber over long distances. However, AM modulation techniques do not work well with soliton systems, because AM components are lost as soliton pulses are propagated. By contrast, FM modulation techniques may be utilized with soliton pulses. The present invention is, therefore, advantageous because it may be used with FM modulation to detect channels in a soliton system.

As will be understood, the modulation of channel signals by FM tones can also cause some AM to be superimposed onto the channel signals as well. Thus, an advantage of the present invention is that FM tones may be detected and their power measured even in the presence of AM tones, with some restrictions. As will be appreciated, the intensity pulses I for a given channel, caused by the FM tone on that channel, will be multiplied in the time domain by any AM tone modulation present on that channel. This results in convolution in the frequency domain. Thus, if the FM tone frequency is $f_{FM}$, then, in the spectrum produced by an FFT of the intensity pulses, there will be a series of spectral lines at $sf_{FM}$, where s is all integers. An AM tone of frequency $f_{AM}$ on the same channel will result in additional spectral lines at $sf_{FM} \pm f_{AM}$. However, these AM-generated spectral lines, which will be small in power compared to the FM harmonic spectral lines, will not be confused for another channel.

For these conditions to hold, the AM tones should not exist at integer submultiples of the FM tones of the defined channels. As will be appreciated, an AM tone exists at an integer submultiple of an FM tone when the AM tone frequency is divisible into the FM tone frequency by an integer. Additionally, when there are many channels, if the FM tone frequency spacing is a constant from tone to tone (and from channel to channel), the AM-generated spectral lines will start to overlap with each other and decrease the signal-to-noise ratio of the detection of the FM spectral lines. This may be avoided by using a non-uniform tone frequency spacing, sometimes referred to as "chirping" the tone frequency locations. For example, the FM tone frequency spacing could be increased linearly from channel to channel.

Alternative Embodiments

As will be appreciated, suitable filters other than a Fabry-Perot interferometer may be utilized in the present invention. In general, a suitably configured filter should have an FSR smaller than the frequency ranges of the channels to be monitored. Such filters include a ring resonator, an asymmetric Mach-Zehnder filter, and a polarization-maintaining fiber surrounded by polarizers. As will be understood, such alternative filters should be configured to have a transmissivity that varies periodically depending upon the wavelength of the light signal passing therethrough, with a periodic response (i.e., FSR) smaller than the frequency range of the light signal. This will cause the filter to provide a plurality of transmissivity peaks (or at least one transmissivity peak) within each defined channel frequency range, so that a relatively low frequency FM tone will cause the filter to provide intensity pulses that are characteristic of the FM tone. Thus, suitable filters effectively convert an FM tone into a characteristic series of intensity pulses by having a transmissivity that changes at least once for each cycle of the FM tone.

In one embodiment, cable 163 may be a polarization-maintaining fiber-optic cable. In an alternative embodiment, reflectors 161 and 162 need not be separated by a light transmission medium such as a fiber-optic cable, but may instead be separated, for example, by air or by a vacuum.

As will further be appreciated, rather than modulate the laser light signal with a sinusoidal FM tone, as illustrated by the sinusoidal signal in graph 220, a periodic FM tone having a non-sinusoidal shape may be used in an alternative embodiment. For example, a sawtooth-shaped, rather than sinusoidal, FM tone may be utilized to modulate the carrier frequency. The use of a sawtooth-shaped FM tone to modulate the carrier light signal can help more evenly space the intensity pulses produced by photodetector 165.

Although the present invention has been described with reference to detection of FM tones in optical signals, those skilled in the art will appreciate that the present invention may also be utilized to detect FM tones in electromagnetic signals other than optical signals.

In the above description, a plurality of transmissivity peaks preferably exists within the frequency range of each channel, which corresponds to the FSR being several times smaller than the frequency range. However, in an alternative embodiment, the FSR may be roughly equal to, although preferably smaller than, the frequency range of all channels, so that at least one transmissivity peak is crossed for each cycle of the FM tone. Despite this alternative embodiment, a higher number of transmissivity peaks within the frequency range is generally preferable, so that the number of intensity pulses per FM tone cycle is less prone to varying. For example, if only one transmissivity peak is guaranteed to be somewhere within the frequency range, variance or drift of system parameters could cause a second peak to drift within the frequency range, which could effectively double the number of intensity pulses from two to four per FM tone cycle. (As will be appreciated, a single transmissivity peak within the frequency range will typically cause two intensity pulses per FM tone cycle, since the same light frequency will occur twice within one cycle, once as the FM tone sine wave is decreasing, and again as it is increasing.) Such drift could also cause there to be no transmissivity peaks to be within the frequency range, causing zero intensity pulses per FM tone cycle. For a larger number of transmissivity peaks per frequency range, such as seven, which produces up to 14 intensity pulses per FM tone cycle, changing this number due to drift to six or eight will change the number of intensity pulses per FM tone cycle to 12 or 16 intensity pulses, a change of, at most, 14%.

Although one embodiment of system 100 is described above with respect to a single channel of data, it will be understood that, in an alternative embodiment, multiple channels of data may be transmitted via cable 120, and also tapped off into line 123. Each channel has a characteristic light signal carrier frequency as well as an FM tone frequency at which the channel light signal is modulated. In such an embodiment, the signal transmitted by processor 110 to modulator 111 on line 112 represents the data to be transmitted by one of any of a number of channels of data signals. For example, in an eight-channel system, processor 110 provides eight binary input signals to modulator 111, and eight lasers of different wavelengths are fed into modulator 111, one for each channel. A separate filter such as filter 150, designed to filter for the wavelength of each respective channel, may be utilized at the receiving end. In one embodiment of such a multi-channel system, splitter 140 taps off a portion of the light signals of each of the channels carried by cable 120 into fiber-optic cable 123. The rest of the channel signals present continue past splitter 140 into the continuing length of cable 120, where they are received by filter 150.

In one embodiment of such a multi-channel system, DSP 170 may be configured to isolate and detect the series of pulses for each FM tone present. Thus, DSP 170 can in this way detect the existence and measure the average power of each FM tone present. Alternatively, the electrical signal produced by photodetector 165 can be filtered with multiple digital filters designed to pass only the harmonics for each channel. A signal demultiplexing device may be used to help detect and monitor separate FM tones. In such an embodiment, a demultiplexer such as a waveguide grating router may be placed on the output of interferometer 160. The demultiplexer would provide a separate output for each channel, which effectively filters out all other channels on each output other than that channel light signal. Each output could then be analyzed to detect and measure for intensity pulses corresponding to the FM tone for that channel only. For example, after performing an FFT for an output that has filtered out all but one channel, the DSP could simply determine whether high-frequency harmonics are present or not, to detect whether or not the channel FM tone is present.

In still another alternative multi-channel system, such a demultiplexer may be placed before interferometer 160. For example, for an eight-channel system, the demultiplexer could have eight separate outputs, each filtering out all but one channel. Each of these outputs could be fed to its own interferometer and DSP equipment, each of which is configured for its respective channel and FM tone.

As will be understood, different channels utilize different carrier frequencies but may utilize the same frequency range. Thus, for a given interferometer, the number of transmissivity peaks with each channel frequency range will typically be different, resulting in a different number of intensity pulses produced per each cycle of the FM tone for that channel. Further, if the FM tone frequencies are different for each channel, the frequency of occurrence of a cycle of intensity pulses for each channel will vary from channel to channel.

In the embodiment described above with reference to FIG. 1, the modulation signal provided by FM source 114 to modulate laser 113 is a periodic signal, such as a 1 KHz tone. Those skilled in the art will appreciate that information may be further encoded on such an FM modulation signal by various modulating techniques, including FM and AM. In such an embodiment, the modulation of the light signal frequency $\omega$ about the channel carrier frequency $\omega_1$ by the FM signal may be referred to as the first modulation. The modulation of the FM signal itself may be referred to as the second modulation, which is used to encode said information. This second modulation may be either frequency modulation or amplitude modulation. Thus, in one embodiment, an FM tone (such as a 1 KHz tone) may be utilized, as described above, to perform first modulation of the light signal.

To perform such second modulation, the FM tone is itself frequency-modulated with an information signal. Thus, sometimes the FM tone has a frequency higher than 1 KHz, and sometimes lower than 1 KHz. In this case, the same number N of transmissivity peaks, on average, will be crossed per FM tone cycle. However, when the FM tone has a lower frequency than 1 KHz, the FM tone cycle will last longer, thereby causing the N transmissivity peaks to be crossed over a longer period of time. Correspondingly, when the FM tone has a higher frequency than 1 KHz, the N transmissivity peaks will be crossed in a shorter than average period of time. These corresponding intensity pulses generated thereby will also be spaced accordingly, which may be detected by DSP 170 to decode the information encoded by the second modulation, as will be appreciated.

Alternatively, to perform the second modulation, the amplitude of the 1 KHz tone may amplitude modulated. In this case, the FM tone will have a constant frequency of 1 KHz, but its amplitude will vary between 0 and a maximum amount. At a 0 amplitude, the light signal frequency $\omega$ will not be modulated by the FM tone at all, and thus will vary little or none in frequency $\omega$. This will result in no crossings of transmissivity peaks per FM tone cycle. At the full amplitude, the light signal frequency $\omega$ varies the full length of the frequency range, thus crossing the maximum number of transmissivity peaks per FM tone cycle. At intermediate second modulation amplitudes, an intermediate number of transmissivity peaks per FM tone cycle will be crossed. The number of corresponding intensity pulses may be detected by DSP 170 to decode the information encoded by the second modulation.

In the embodiment described above, each channel has a unique FM tone frequency at which the channel light signal is modulated. In an alternative embodiment, one or more of such multiple channels may utilize the same FM tone frequency.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for detecting presence of a modulation signal in an electromagnetic signal, comprising:

(a) a filter having a fixed frequency response; and (b) a detector, wherein:

the filter is adapted to receive an electromagnetic signal having varying frequency resulting from modulation of a carrier frequency over a frequency range by a modulation signal;

the filter has a plurality of transmissivity peaks over the frequency range, whereby the filter generates a plurality of intensity pulses as the frequency of the electromagnetic signal varies over the frequency range; and the detector is adapted to detect the modulation signal based on the plurality of intensity pulses.

2. The invention of claim 1, wherein the detector comprises a photodetector and a processor, wherein the photodetector is adapted to convert the plurality of intensity pulses to an electrical signal and the processor is adapted to analyze the electrical signal to detect the modulation signal.

3. The invention of claim 1, wherein the filter is a Fabry-Perot interferometer having a round-trip signal path of approximately one meter.

4. The invention of claim 1, further comprising:
(c) a transmitter; and
(d) a splitter; wherein:
the transmitter generates and transmits the electromagnetic signal to a receiver over a fiber-optic cable; and
the splitter taps off a portion of the electromagnetic signal and transmits the portion to the filter.

5. The invention of claim 4, wherein the transmitter comprises:
(1) a modulation-signal source; and
(2) a signal generator; wherein:
the modulation-signal source generates the modulation signal; and
the signal generator generates a modulated signal in accordance with the modulation signal.

6. The invention of claim 5, wherein the transmitter further comprises:
(3) a processor; and
(4) a chopper; wherein:
the processor generates a binary electrical signal; and
the chopper generates the electromagnetic signal by enabling and disabling transmission of the modulated signal in accordance with the binary electrical signal.

7. The invention of claim 1, wherein the electromagnetic signal corresponds to one of a plurality of channels, each channel resulting from modulation of a different carrier frequency over a corresponding frequency range by a corresponding modulation signal, wherein:
the filter is adapted to generate a plurality of intensity pulses for each channel; and
the detector is adapted to detect the modulation signal of each channel in accordance with the plurality of intensity pulses for said each channel.

8. The invention of claim 1, wherein the detector is adapted to measure the power of the modulation signal based on the plurality of intensity pulses.

9. The invention of claim 1, wherein the modulation signal is a periodic tone and the electromagnetic signal is an optical signal carried by a fiber-optic cable.

10. The invention of claim 1, wherein the modulation signal has a frequency substantially smaller than the carrier frequency.

11. The invention of claim 1, wherein the frequency of the modulation signal is substantially smaller than the frequency range.

12. The invention of claim 1, wherein:
the carrier frequency is on the order of hundreds of TeraHertz;
the frequency range is on the order of GigaHertz; and
the modulation signal has a frequency on the order of KiloHertz.

13. The invention of claim 1, further comprising:
(c) a transmitter comprising:
(1) a modulation-signal source;
(2) a signal generator;
(3) a processor; and
(4) a chopper; and
(d) a splitter; wherein:
the modulation-signal source generates the modulation signal;
the signal generator generates a modulated signal in accordance with the modulation signal;
the processor generates a binary electrical signal;
the chopper generates the electromagnetic signal by enabling and disabling transmission of the modulated signal in accordance with the binary electrical signal;
the splitter taps off a portion of the electromagnetic signal and transmits the portion to the filter;
the detector comprises a photodetector and a detector processor;
the photodetector is adapted to convert the plurality of intensity pulses to an electrical signal;
the detector processor is adapted to analyze the electrical signal to detect the modulation signal and to measure the power of the modulation signal based on the plurality of intensity pulses;
the filter is a Fabry-Perot interferometer having a round-trip signal path of approximately one meter;
the electromagnetic signal is an optical signal carried by a fiber-optic cable; and
the modulation signal is a periodic tone having a frequency substantially smaller than the carrier frequency and substantially smaller than the frequency range.

14. A method for detecting a channel of a fiber-optic system, the method comprising the steps of:
(a) receiving an electromagnetic signal corresponding to the channel and having varying frequency resulting from modulation of a carrier frequency over a frequency range by a modulation signal;
(b) generating a plurality of intensity pulses using a filter having a fixed frequency response as the frequency of the electromagnetic signal varies over the frequency range; and
(c) detecting the channel in accordance with the intensity pulses.

15. The invention of claim 14, wherein the plurality of intensity pulses is generated by a filter having a plurality of transmissivity peaks over the frequency range.

16. The invention of claim 14, wherein the channel is detected by a detector having a photodetector and a processor, wherein the photodetector is adapted to convert the plurality of intensity pulses to an electrical signal and the processor is adapted to analyze the electrical signal to detect the modulation signal.

17. The invention of claim 14, wherein the plurality of intensity pulses is generated by a Fabry-Perot interferometer having a plurality of transmissivity peaks over the frequency range and a round-trip signal path of approximately one meter.

18. The invention of claim 14, further comprising the steps of:
(d) generating and transmitting, with a transmitter, the electromagnetic signal to a receiver over a fiber-optic cable; and
(e) tapping off a portion of the electromagnetic signal and transmitting the portion to the filter.

19. The invention of claim 18, wherein:
the transmitter comprises:
(1) a modulation-signal source; and
(2) a signal generator; and
step (d) further comprises the steps of:
(1) generating the modulation signal with the modulation-signal source; and
(2) generating a modulated signal in accordance with the modulation signal with the signal generator.

20. The invention of claim 19, wherein:
the transmitter further comprises:
(3) a processor; and
(4) a chopper; and
step (d) further comprises the steps of:
(3) generating a binary electrical signal with the processor; and
(4) generating the electromagnetic signal with the chopper by enabling and disabling transmission of the modulated signal in accordance with the binary electrical signal.

21. The invention of claim 14, wherein the electromagnetic signal corresponds to one of a plurality of channels, each channel resulting from modulation of a different carrier frequency over a corresponding frequency range by a corresponding modulation signal, wherein:
step (a) comprises the step of receiving an electromagnetic signal for each of the plurality of channels;
step (b) comprises the step of generating a plurality of intensity pulses for each channel; and
step (c) comprises the step of detecting each channel in accordance with the intensity pulses for said each channel.

22. The invention of claim 14, wherein step (c) comprises the step of measuring the power of the modulation signal based on the plurality of intensity pulses.

23. The invention of claim 14, wherein the modulation signal is a periodic tone and the electromagnetic signal is an optical signal carried by a fiber-optic cable.

24. The invention of claim 14, wherein the modulation signal has a frequency substantially smaller than the carrier frequency.

25. The invention of claim 14, wherein the frequency of the modulation signal is substantially smaller than the frequency range.

26. The invention of claim 14, wherein:
the carrier frequency is on the order of hundreds of TeraHertz;
the frequency range is on the order of GigaHertz; and
the modulation signal has a frequency on the order of KiloHertz.

27. The invention of claim 14, further comprising the steps of:
(d) generating and transmitting, with a transmitter, the electromagnetic signal to a receiver over a fiber-optic cable, wherein:
the transmitter comprises:
(1) a modulation-signal source;
(2) a signal generator;
(3) a processor; and
(4) a chopper; and
step (d) further comprises the steps of:
(1) generating the modulation signal with the modulation-signal source;
(2) generating a modulated signal in accordance with the modulation signal with the signal generator;
(3) generating a binary electrical signal with the processor; and
(4) generating the electromagnetic signal with the chopper by enabling and disabling transmission of the modulated signal in accordance with the binary electrical signal; and
(e) tapping off a portion of the electromagnetic signal and transmitting the portion to the filter; wherein:
the plurality of intensity pulses is generated by a Fabry-Perot interferometer having a plurality of transmissivity peaks over the frequency range and having a round-trip signal path of approximately one meter;
the channel is detected by a detector having a photodetector and a processor, wherein the photodetector is adapted to convert the plurality of intensity pulses to an electrical signal and the processor is adapted to analyze the electrical signal to detect the modulation signal;
step (c) comprises the step of measuring the power of the modulation signal based on the plurality of intensity pulses;
the modulation signal is a periodic tone having a frequency substantially smaller than the carrier frequency and substantially smaller than the frequency range; and
the electromagnetic signal is an optical signal.

28. An apparatus for detecting presence of a modulation signal in an electromagnetic signal, comprising:
(a) a transmitter adapted to generate and transmit, over a fiber-optic cable, an electromagnetic signal resulting from modulation of a carrier frequency over a frequency range by a modulation signal, the transmitter comprising:
(1) a modulation-signal generator adapted to generate the modulation signal;
(2) a signal generator adapted to generate a modulated signal in accordance with the modulation signal;
(3) a processor adapted to generate a binary electrical signal; and
(4) a chopper adapted to generate the electromagnetic signal by enabling and disabling transmission of the modulated signal in accordance with the binary electrical signal;
(b) a filter adapted to receive an electromagnetic signal, wherein the filter has a plurality of transmissivity peaks over the frequency range, whereby the filter generates a plurality of intensity pulses as frequency of the electromagnetic signal varies over the frequency range; and
(c) a detector adapted to detect the modulation signal based on the plurality of intensity pulses.

29. The invention of claim 28, wherein the transmitter transmits the electromagnetic signal over the fiber-optic cable to a receiver, and further comprising a splitter adapted to tap off a portion of the electromagnetic signal and transmit the portion to the filter.

30. The invention of claim 28, wherein the filter has a fixed frequency response and the electromagnetic signal has varying frequency.

31. A method for detecting a channel of a fiber-optic system, the method comprising the steps of:
(a) receiving an electromagnetic signal corresponding to the channel and resulting from modulation of a carrier frequency over a frequency range by a modulation signal to generate a modulated signal and by enabling and disabling transmission of the modulated signal in accordance with a binary electrical signal;
(b) generating a plurality of intensity pulses as frequency of the electromagnetic signal varies over the frequency range; and
(c) detecting the channel in accordance with the intensity pulses.

32. The invention of claim 31, further comprising the steps of:
(d) generating and transmitting, with a transmitter, the electromagnetic signal over a fiber-optic cable, wherein the transmitter comprises:

(1) a modulation-signal source generating the modulation signal;
(2) a signal generator generating the modulated signal in accordance with the modulation signal;
(3) a processor generating the binary electrical signal; and
(4) a chopper generating the electromagnetic signal by enabling and disabling transmission of the modulated signal in accordance with the binary electrical signal.

33. The invention of claim 32, wherein the electromagnetic signal is transmitted over the fiber-optic cable to a receiver and further comprising the step of tapping off a portion of the electromagnetic signal and transmitting the portion to the filter.

34. The invention of claim 31, wherein the electromagnetic signal has varying frequency.

35. An apparatus for detecting presence of a modulation signal in an optical signal, comprising:

(a) an optical filter having a fixed frequency response; and
(b) an optical detector, wherein:

the optical filter is adapted to receive, from a fiber-optic cable, an optical signal having varying frequency resulting from modulation of a carrier frequency over a frequency range by a modulation signal;

the optical filter has a plurality of optical transmissivity peaks over the frequency range, whereby the optical filter generates a plurality of optical intensity pulses as the frequency of the optical signal varies over the frequency range; and the optical detector is adapted to detect the modulation signal based on the plurality of optical intensity pulses.

36. A method for detecting an optical channel of a fiber-optic system, the method comprising the steps of:

(a) receiving an optical signal corresponding to the optical channel and having varying frequency resulting from modulation of a carrier frequency over a frequency range by a modulation signal;

(b) generating a plurality of optical intensity pulses using an optical filter having a fixed frequency response as the frequency of the optical signal varies over the frequency range; and (c) detecting the optical channel in accordance with the optical intensity pulses.

* * * * *